United States Patent
Furukawa et al.

(10) Patent No.: US 9,194,458 B2
(45) Date of Patent: Nov. 24, 2015

(54) FRICTION TRANSMISSION BELT

(75) Inventors: Satoshi Furukawa, Yamatokoriyama (JP); Kazuma Yamamoto, Yamatokoriyama (JP)

(73) Assignee: GATES CORPORATION, Denver, CO (US)

(*) Notice: Subject to any disclaimer, the term of this patent is extended or adjusted under 35 U.S.C. 154(b) by 135 days.

(21) Appl. No.: 14/005,972

(22) PCT Filed: Feb. 1, 2012

(86) PCT No.: PCT/JP2012/052207
§ 371 (c)(1),
(2), (4) Date: Nov. 6, 2013

(87) PCT Pub. No.: WO2012/132537
PCT Pub. Date: Oct. 4, 2012

(65) Prior Publication Data
US 2014/0066244 A1     Mar. 6, 2014

(30) Foreign Application Priority Data
Mar. 31, 2011   (JP) .................................. 2011-079953

(51) Int. Cl.
*F16G 5/00*     (2006.01)
*F16G 1/00*     (2006.01)
(Continued)

(52) U.S. Cl.
CPC *F16G 5/08* (2013.01); *B29D 29/00* (2013.01); *C08J 5/06* (2013.01); *F16G 5/20* (2013.01);
(Continued)

(58) Field of Classification Search
CPC ............... F16G 5/20; F16G 5/06; F16G 1/08; F16G 1/28; B29D 29/103
See application file for complete search history.

(56) References Cited

U.S. PATENT DOCUMENTS

| 4,047,446 A | * | 9/1977 | Speer ........................... 474/238 |
| 4,892,510 A | * | 1/1990 | Matsuoka et al. ............ 474/252 |

(Continued)

FOREIGN PATENT DOCUMENTS

| DE | 102008055530 A1 | 6/2010 |
| JP | 63-284241 A | 11/1988 |

(Continued)

OTHER PUBLICATIONS

Japanese Patent Office, International Search Report, mailing date May 1, 2012.

(Continued)

*Primary Examiner* — Henry Liu
(74) *Attorney, Agent, or Firm* — Paul N. Dunlap, Esq.; Jeffrey A. Thurnau, Esq.

(57) ABSTRACT

The durability of a frictional power transmission belt is improved. A V-ribbed belt (10) comprises an adhesion rubber portion (12) and a compression rubber portion (14) provided below the adhesion rubber portion (12). A cord (11) that is a tension member of the belt is embedded in the adhesion rubber portion (12). The adhesion rubber portion (12) includes an upper layer (12A) constituting the upper side and a lower layer (12B) constituting the lower side, which are located across the cord (11). The upper layer (12A) and the lower layer (12B) are obtained by vulcanizing a rubber composition including a high-viscosity elastomer such as EPM or EPDM, and a low-viscosity elastomer which is lower in Mooney viscosity than the high-viscosity elastomer, and contain modified nylon microfibers as short fibers (21A), (21B), respectively. The short fibers (21A), (21B) are oriented, respectively, in the width direction and longitudinal direction of the belt.

15 Claims, 3 Drawing Sheets

(51) Int. Cl.
*F16G 9/00* (2006.01)
*F16G 5/08* (2006.01)
*F16G 5/20* (2006.01)
*B29D 29/00* (2006.01)
*C08J 5/06* (2006.01)
*C08L 23/16* (2006.01)
*C08L 77/02* (2006.01)
*C08L 77/06* (2006.01)

(52) U.S. Cl.
CPC ............... *C08L 23/16* (2013.01); *C08L 77/02* (2013.01); *C08L 77/06* (2013.01); *C08L 2205/02* (2013.01); *C08L 2205/025* (2013.01); *C08L 2205/16* (2013.01)

(56) References Cited

U.S. PATENT DOCUMENTS

| | | | |
|---|---|---|---|
| 6,071,996 A | 6/2000 | Davis et al. | |
| 6,489,385 B1 | 12/2002 | Fujii et al. | |
| 6,491,598 B1 * | 12/2002 | Rosenboom | 474/260 |
| 6,561,937 B1 * | 5/2003 | Wegele | 474/263 |
| 6,609,990 B2 * | 8/2003 | Kopang | 474/264 |
| 6,669,592 B2 * | 12/2003 | Hayashi | 474/268 |
| 6,758,779 B2 * | 7/2004 | Fujimoto | 474/260 |
| 7,137,918 B2 * | 11/2006 | Nonnast et al. | 474/260 |
| 7,988,577 B2 * | 8/2011 | Omori et al. | 474/249 |
| 8,197,372 B2 * | 6/2012 | Wu et al. | 474/263 |
| 8,944,948 B2 * | 2/2015 | Matsuda | 474/263 |
| 2001/0051555 A1 * | 12/2001 | Isshiki et al. | 474/263 |
| 2002/0039947 A1 * | 4/2002 | Hasaka et al. | 474/263 |
| 2003/0139242 A1 * | 7/2003 | Teves et al. | 474/263 |
| 2004/0048708 A1 * | 3/2004 | Nonnast et al. | 474/260 |
| 2004/0204275 A1 * | 10/2004 | Burrowes et al. | 474/263 |
| 2006/0154770 A1 * | 7/2006 | Takaba et al. | 474/263 |
| 2007/0249451 A1 * | 10/2007 | Wu et al. | 474/263 |
| 2007/0249452 A1 * | 10/2007 | South | 474/263 |
| 2009/0011884 A1 * | 1/2009 | Nakashima et al. | 474/205 |
| 2009/0291796 A1 * | 11/2009 | Mitsutomi et al. | 474/252 |
| 2011/0269588 A1 * | 11/2011 | Fleck et al. | 474/205 |
| 2012/0021860 A1 * | 1/2012 | Matsuda | 474/260 |
| 2012/0295748 A1 * | 11/2012 | Shiriike | 474/148 |
| 2013/0217528 A1 * | 8/2013 | Matsumoto et al. | 474/263 |

FOREIGN PATENT DOCUMENTS

| | | |
|---|---|---|
| JP | 9-286050 A | 11/1997 |
| JP | 2002-81506 A | 3/2002 |
| JP | 2009019663 A | 1/2009 |
| WO | 2006112386 A1 | 10/2006 |

OTHER PUBLICATIONS

European Patent Office, Extended European Search Report PCT/JP2012/052207, Dated Jun. 17, 2015.

* cited by examiner

FRICTION TRANSMISSION BELT

TECHNICAL FIELD

The present invention relates to a frictional power transmission belt such as a V-ribbed belt used, for example, under high-tension and high-load environments.

BACKGROUND ART

Frictional power transmission belts such as V-ribbed belts have been widely used as belts for transmitting power to auxiliaries in automobile engines and the like, for example. Recently, frictional power transmission belts have been increasingly used under high-tension and high-load environments, because the size reduction of engines has led to reduction in the number of ribs and the width of the belt, and because loads due to driving of auxiliaries have increased. For this reason, frictional power transmission belts are required to have a rubber having a high modulus and high tear resistance performance as an adhesion rubber located around a cord that is a tension member.

Conventionally, a V-ribbed belt used under a high-load environment is known in which a short fiber is included in at least a part of an adhesion rubber to provide a high modulus to the adhesion rubber, as disclosed in Patent Document 1. Here, an ordinary nylon or aramid fiber, or a modified nylon microfiber obtained by bonding polyolefin to a nylon fiber is used as the short fiber. In addition, for example, EPDM is used as a rubber component of the adhesion rubber to improve the heat resistance and durability.

Patent Document 1: Japanese Patent Application Publication No. 2007-198485

SUMMARY OF INVENTION

Technical Problems

When an ordinary nylon or aramid fiber is included in the adhesion rubber, as shown in Patent Document 1, it is difficult to improve the adhesion between the adhesion rubber and the cord, and hence cord separation in which separation occurs at the interface between the cord and the rubber cannot be prevented sufficiently. In addition, when an adhesion rubber having an ordinary constitution using EPDM includes the modified nylon microfiber in a large amount to increase the modulus, there is a problem that the raw material rubber and the modified nylon microfiber cannot be kneaded with each other sufficiently.

In this respect, an object of the present invention is to provide a frictional power transmission belt with which the possibility of cord separation is reduced, while the modulus and tear resistance performance of the adhesion rubber are improved, and further with which the rubber composition of the adhesion rubber can be kneaded appropriately.

Solution to Technical Problems

A frictional power transmission belt according to the present invention is a frictional power transmission belt, which is formed from rubber and includes an embedded cord that extends in the longitudinal direction of the belt, wherein at least a part of the rubber surrounding the cord is obtained by vulcanizing a rubber composition that includes a high-viscosity elastomer (a first component) and a low-viscosity elastomer (a second component), and contains a modified nylon microfiber, and the high-viscosity elastomer is at least one elastomer selected from the group consisting of ethylene-propylene copolymers and ethylene-propylene-diene terpolymers, and the low-viscosity elastomer is lower in Mooney viscosity than the high-viscosity elastomer.

The Mooney viscosity of the low-viscosity elastomer is preferably less than or equal to 10, and the Mooney viscosity of the high-viscosity elastomer is preferably greater than or equal to 50. In addition, the weight ratio of the high-viscosity elastomer to the low-viscosity elastomer is preferably 95:5 to 50:50.

In at least a part (rubber composition) of the rubber, the nylon fiber quantity of the modified nylon microfiber is preferably not less than 10 parts by weight relative to 100 parts by weight of the elastomers. For example, the modified nylon microfiber is obtained by modification with at least polyolefin and an elastomer, and a specific example thereof is a nylon fiber to which at least polyolefin and an elastomer as a third component are chemically bonded.

Further, the modified nylon microfiber may be obtained by bonding nylon fiber to a matrix composed of polyolefin, an elastomer and spherical silica with average particle diameter of 1 μm or less and moisture content of 1000 ppm or less.

The low-viscosity elastomer is preferably at least one elastomer selected from the group consisting of ethylene-propylene copolymers and ethylene-propylene-diene terpolymers. In this case, the weight ratio of the high-viscosity elastomer to the low-viscosity elastomer is preferably 70:30 to 50:50.

The frictional power transmission belt may comprise an adhesion rubber portion which contains the modified nylon microfiber and is formed by vulcanizing the rubber composition. In this case, the cord is preferably embedded in the adhesion rubber portion. In addition, the frictional power transmission belt comprises a compression rubber portion provided below the adhesion rubber portion, for example. The compression rubber portion includes a short fiber oriented in the width direction of the belt, for example.

The adhesion rubber portion may be composed of an upper layer constituting the upper side and a lower layer constituting the lower side, which are located across the cord. In this case, each of the upper layer and lower layer preferably contains the modified nylon microfiber and is formed by vulcanizing the rubber composition. In addition, the modified nylon microfiber contained in the upper layer is preferably oriented in the width direction of the belt, while the modified nylon microfiber contained in the lower layer is preferably oriented in the longitudinal direction of the belt.

A method of manufacturing a frictional power transmission belt according to the present invention is a method of manufacturing a frictional power transmission belt which is formed from rubber and includes an embedded cord that extends in the longitudinal direction of the belt, the method comprising: a first step of obtaining a rubber composition by kneading a modified nylon microfiber, a high-viscosity elastomer and a low-viscosity elastomer; and a second step of molding the rubber composition as a rubber adhered to the cord by arranging the rubber composition around the cord followed by vulcanizing, wherein the high-viscosity elastomer is at least one elastomer selected from the group consisting of ethylene-propylene copolymers and ethylene-propylene-diene terpolymers, and the low-viscosity elastomer is lower in Mooney viscosity than the high-viscosity elastomer.

An adhesion rubber according to the present invention is an adhesion rubber provided to surround a cord that is a tension member of a belt, wherein at least a part of the adhesion rubber is obtained by vulcanizing a rubber composition that includes a high-viscosity elastomer and a low-viscosity elastomer, and contains a modified nylon microfiber, and the high-viscosity elastomer is at least one elastomer selected from the group consisting of ethylene-propylene copolymers and ethylene-propylene-diene terpolymers, and the low-viscosity elastomer is lower in Mooney viscosity than the high-viscosity elastomer.

A rubber composition according to the present invention comprises a modified nylon microfiber, a high-viscosity elastomer and a low-viscosity elastomer, wherein the high-viscosity elastomer is at least one elastomer selected from the group consisting of ethylene-propylene copolymers and ethylene-propylene-diene terpolymers, and the low-viscosity elastomer is lower in Mooney viscosity than the high-viscosity elastomer.

Advantageous Effects of Invention

In the present invention, the possibility of cord separation is reduced, while the modulus and the tear resistance performance of the adhesion rubber portion are improved, and further the rubber composition of the adhesion rubber can be kneaded appropriately.

LIST OF REFERENCE NUMBERS

10 V-ribbed belt (frictional power transmission belt)
11 cord
12 adhesion rubber portion
12A upper layer
12B lower layer
14 compression rubber portion
15 rib
21A, 21B short fiber (modified nylon microfiber)

DESCRIPTION OF EMBODIMENTS

Hereinafter, an embodiment of the present invention is described with reference to the drawings.

Figure 1:
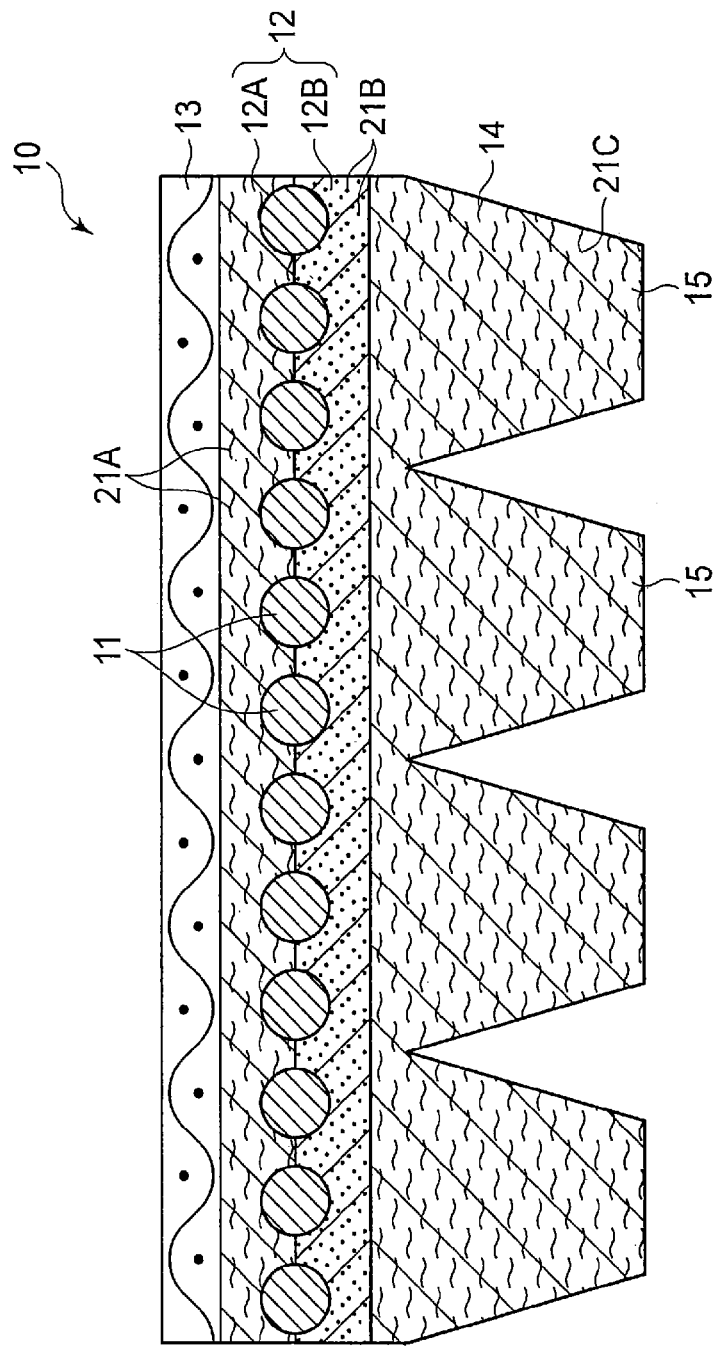
FIG. 1 is a cross-sectional view of a V-ribbed belt of an embodiment of the present invention.

FIG. 1 is a cross-sectional view showing a V-ribbed belt according to one embodiment of the present invention. A V-ribbed belt 10 is an endless frictional power transmission belt formed from rubber, and includes an adhesion rubber portion 12, a compression rubber portion 14 formed on the lower surface of the adhesion rubber portion 12 integrally with the adhesion rubber portion 12, and a fabric 13 attached onto the upper surface of the adhesion rubber portion 12.

In the adhesion rubber portion 12, a cord 11 is embedded and is a tension member of the belt. The adhesion rubber portion 12 is rubber which surrounds the cord 11 and which is adhered to the cord 11. The cord 11 extends in the longitudinal direction of the belt in the adhesion rubber portion 12, while spirally wound. The compression rubber portion 14 includes multiple (four in this embodiment) ribs 15 arranged in the width direction. Each of the ribs 15 extends in the longitudinal direction of the belt, and has a width that is tapered toward the lower side of the belt. The belt 10 is used to transmit power from the driving side to the driven side by friction transmission achieved by engagement of the compression rubber portion 14 with pulleys. In addition, the fabric 13 may be subjected to any of various impregnation treatments such as RFL treatment and rubber cement treatment to improve the adhesion with an upper layer 12A.

The adhesion rubber portion 12 includes an upper layer 12A constituting the upper side of the adhesion rubber portion 12 and a lower layer 12B constituting the lower side thereof, which are located across the cord 11. Innumerable pieces of short fibers 21A, 21B are included substantially uniformly in the upper layer 12A and the lower layer 12B, respectively. The short fiber 21A in the upper layer 12A is oriented in the width direction of the belt, whereas the short fiber 21B in the lower layer 12B is oriented in the longitudinal direction of the belt. The short fibers 21A, 21B are modified nylon microfibers each obtained by modifying a nylon fiber with a polyolefin and an elastomer. Specifically, the modified nylon microfibers are those in which at least a polyolefin and an elastomer as a third component are chemically bonded to a nylon fiber, as will be described later.

As the nylon fiber used for the modified nylon microfiber, 6-nylon is preferable. Alternatively, 6.6-nylon, 6.10-nylon, or the like may also be used. Meanwhile, polyethylene is preferably used as the polyolefin. However, the polyolefin is not limited to polyethylene, and polypropylene or the like may also be used.

The nylon fiber in the adhesion rubber portion 12 is such that the fiber length $L_F$ thereof is approximately 4000 μm or less, the fiber diameter $D_F$ thereof is approximately 1.5 μm or less, and the value $(L_F/D_F)$ of the aspect ratio of the fiber length $L_F$ to the fiber diameter $D_F$ is 10 or more. Preferably, the fiber length $L_F$ is 1000 μm or less, the fiber diameter $D_F$ is approximately 1.0 μm or less, and the value $(L_F/D_F)$ of the aspect ratio is in the range from 500 to 1000, both inclusive. A large fiber diameter $D_F$ or a large fiber length $L_F$ causes to develop cracks or cord separation, and so that the drive lifetime of the belt tends to decrease.

In addition, the nylon fiber quantity of the modified nylon microfiber in each of the upper layer 12A and the lower layer 12B is not less than 10 parts by weight, and preferably 10 to 15 parts by weight, relative to 100 parts by weight of the elastomers in the corresponding upper layer 12A and lower layer 12B. The incorporation of 10 parts by weight or more of the nylon fiber increases the moduli of the upper layer 12A and the lower layer 12B, making it possible to improve the drive lifetime of the belt. Meanwhile, incorporation of the nylon fiber in an amount of 15 parts by weight or more may cause poor dispersion.

The adhesion rubber portion 12 (the upper layer 12A and the lower layer 12B) is obtained by vulcanizing a rubber composition (adhesion rubber portion rubber composition) containing a high-viscosity elastomer as a first component, a low-viscosity elastomer as a second component, and an elastomer (fiber-containing elastomer) containing a modified nylon microfiber, as a third component. The high-viscosity elastomer is an elastomer having a Mooney viscosity which is greater than or equal to 50. The low-viscosity elastomer is an elastomer having a Mooney viscosity which is less than or equal to 10, and is lower in Mooney viscosity than the high-viscosity elastomer. Note that the Mooney viscosity of the high-viscosity elastomer is preferably 50 to 150. In addition, the Mooney viscosity in this description refers to a Mooney viscosity ($ML_{1+4}$, 125° C.) determined according to JIS K 6300 at 125° C.

As the high-viscosity elastomer, an ethylene-propylene copolymer (hereinafter referred to as EPM) or an ethylene-propylene-diene terpolymer (hereinafter referred to as EPDM) having a Mooney viscosity which is greater than or equal to 50, or a mixture thereof is used.

Meanwhile, as the low-viscosity elastomer, EPM or EPDM having a Mooney viscosity which is less than or equal to 10, or a mixture thereof is used. Alternatively, other ethylene-α-olefin copolymers such as ethylene-1-octene copolymers may be used, or elastomers other than ethylene-α-olefin copolymers may also be used. In this embodiment, when EPM or EPDM is used as the low-viscosity elastomer, the resultant V-ribbed belt 10 has further improved durability.

In this embodiment, the weight ratio represented by high-viscosity elastomer: low-viscosity elastomer is set to 95:5 to 50:50. Such a weight ratio results in improvement in mixability in kneading steps described later, particularly, in secondary kneading where the kneading temperature is low, and makes it possible to impart a high modulus to the adhesion rubber portion 12. In addition, when the low-viscosity elastomer is EPM, EPDM, or a mixture thereof, the weight ratio represented by high-viscosity elastomer: low-viscosity elastomer is preferably 70:30 to 50:50, and particularly preferably 65:35 to 55:45. By setting the weight ratio within such a range, the belt lifetime can be further improved.

The fiber-loaded elastomer contains (a) a polyolefin, (b) an elastomer as a third component, and (c) an ultrafine nylon fiber. The components (a) and (b) constitute a matrix. The nylon fiber is dispersed in the matrix, and is chemically bonded to the components (a) and (b). Here, the chemical bonding of the nylon fiber to the components (a) and (b) is achieved by, for example, a silane coupling agent. Such fiber-loaded elastomers are disclosed, for example, in Japanese Patent Application Publication No. H07-278360 and Japanese Patent Application Publication No. H09-59435.

In addition, the fiber-loaded elastomer may be composed as follows. Specifically, the fiber-loaded elastomer may also contain (d) a spherical silica with an average particle diameter of 1 μm or less and a moisture content of 1000 ppm or less (hereinafter referred to as a small-particle-diameter spherical silica), in addition to the components (a) to (c); the nylon fiber may be dispersed in a matrix composed of the components (a), (b) and (d); and the nylon fiber may be chemically bonded to the matrix. When the matrix bonded to the nylon fiber contains the small-particle-diameter spherical silica as described above, the strength of the modified nylon microfiber can be further increased.

In the adhesion rubber portion rubber composition, the polyolefin is preferably incorporated in an amount of 1 to 40 parts by weight relative to 100 parts by weight of the elastomers. In addition, the small-particle-diameter spherical silica is preferably incorporated in an amount of 1 to 50 parts by weight relative to 100 parts by weight of the elastomers.

In this description, the average particle diameter refers to a diameter determined by a laser diffraction/scattering method using a laser diffraction/scattering particle size distribution analyzer LA-750 manufactured by HORIBA, Ltd as follows. Specifically, the concentration of a sample is adjusted by gradually introducing the sample into a chemical bath for determination of the analyzer, so that the light transmission of the sample can be a standard value. After that, the average particle diameter is determined according to automatic measurement of the analyzer. Meanwhile, the moisture content refers to a weight loss determined as follows. Specifically, 10 g of a sample is weighed into a crucible, heated in a dryer set to 105° C. for 2 hours, and subsequently cooled in a desiccator for prevention of moisture absorption, and the sample is weighed after the cooling.

The elastomer as the third component contained in the fiber-loaded elastomer is preferably smaller in incorporated amount (weight) than the second component, and is preferably EPM, EPDM, or a mixture thereof. For example, an elastomer which is lower in Mooney viscosity than the high-viscosity elastomer, and higher in Mooney viscosity than the low-viscosity elastomer is used as the elastomer of the third component.

Besides the high-viscosity elastomer, the low-viscosity elastomer, and the fiber-loaded elastomer, various additives including a large-particle-diameter silica having a larger average particle diameter than the small-particle-diameter spherical silica, a filler such as carbon black, a vulcanization agent, a vulcanization aid, an antioxidant, a retarder, a metal cross-linking agent, and the like are incorporated into the rubber composition (adhesion rubber portion rubber composition) of the upper layer 12A and the lower layer 12B. In addition, the rubber compositions used to form the upper layer 12A and the lower layer 12B may have the same constitution, or different constitutions.

Innumerable pieces of a short fiber 21C are included substantially uniformly in the compression rubber portion 14 to reinforce the compression rubber portion 14. The short fiber 21C is oriented in the width direction of the belt. Part of the short fiber 21C is exposed on or protrudes from a surface of the compression rubber portion 14. This makes it possible to reduce the frictional coefficient of the surface of the compression rubber portion 14, and thus reduce the possibility of noise generation during the driving of the belt, and the like. To sufficiently reduce the frictional coefficient, a fiber having a larger diameter than the short fibers 21A, 21B, which are modified nylon microfibers, is used as the short fiber 21C. In addition, an aramid short fiber is used as the short fiber 21C when the belt is used under a high-load environment, whereas a nylon short fiber is used as the short fiber 21C when it is necessary to sufficiently reduce the possibility of noise generation during the driving of the belt, for example. Moreover, EPM, EPDM, or the like is preferably used as the elastomer of the compression rubber portion 14.

The rubber composition of the adhesion rubber portion according to this embodiment is prepared as follows. First, the fiber-loaded elastomer and the unvulcanized high-viscosity elastomer and low-viscosity elastomer are introduced together with predetermined additives, into a kneader, and are kneaded at a predetermined heating temperature (for example, 150° C. or above) to obtain a uniform mixture (primary kneading). Note that additives such as a vulcanization agent, which vulcanizes the elastomers upon heating to the heating temperature in the primary kneading, are not introduced in the primary kneading. The mixture obtained by kneading in the primary kneading is then cooled to a temperature lower than the vulcanization temperature of the vulcanization agent (for example, 130° C. or below), and then the additives such as a vulcanization agent not added in the primary kneading are added, and the mixture is further kneaded to obtain a uniform mixture (secondary kneading). Thus, the rubber composition of the adhesion rubber portion is obtained. Here, the nylon fiber is finely fragmented in advance in the fiber-loaded elastomer. However, the nylon fiber may be finely fragmented in the primary kneading or the secondary kneading to produce the above described fiber diameter $D_F$ and fiber length $L_F$.

Figure 2:
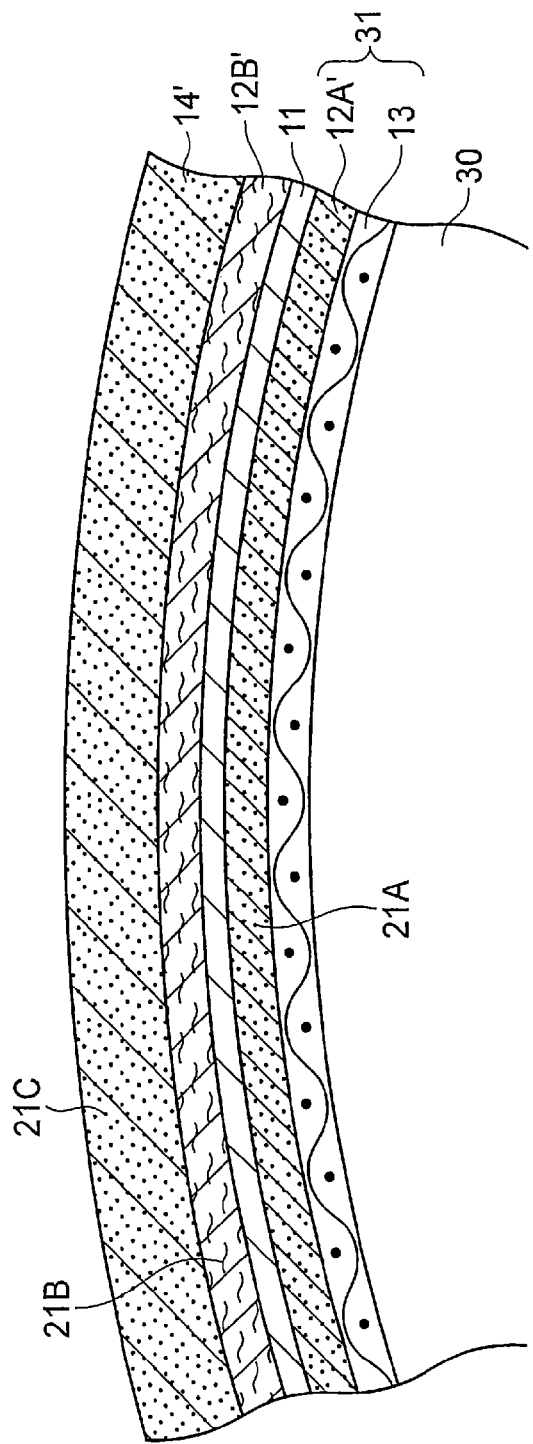
FIG. 2 is a cross-sectional view showing a method of manufacturing a V-ribbed belt of the embodiment.

Next, a method of manufacturing the V-ribbed belt is described by using FIG. 2. In this manufacturing method, a rubber-provided fabric 31 is first prepared in which an unvulcanized rubber layer 12A' is laminated on one surface of the fabric 13 by using an unillustrated calendaring machine. Specifically, while being rolled by rollers of the calendering machine, the rubber composition of the adhesion rubber portion is laminated on the fabric 13 and fed in the rolling direction by the rollers. Thereby, the rubber-provided fabric 31 is obtained. Here, during the rolling of the rubber composition of the adhesion rubber portion, the short fiber 21A incorporated in the rubber composition is oriented in the rolling direction (i.e., the feeding direction of the fabric).

Next, the rubber-provided fabric 31 is wound around the outer periphery of a cylindrical mandrel 30, with the fabric 13 being on the inner side and the rubber layer 12A' being on the outer side. In this case, the rubber-provided fabric 31 is wound in such a manner that the orientation direction of the short fiber 21A is the same as the axial direction of the mandrel 30. In other words, the fabric 13 is arranged in such a manner that the feed direction of the fabric 13 in the calendering machine extends along the axial direction of the mandrel 30.

The cord 11 is spirally wound around the unvulcanized rubber layer 12A' of the rubber-provided fabric 31, and a first rubber sheet 12B' is wound around the cord 11. The first rubber sheet 12B' is obtained by rolling the rubber composition of the adhesion rubber portion by calendering or the like, by which the short fiber 21B (modified nylon microfiber) is oriented in the rolling direction. On the mandrel 30, the orientation direction of the short fiber 21B is the same as the circumferential direction of the mandrel 30. Thus, the cord 11 is arranged so as to be sandwiched in the rubber composition of the adhesion rubber portion.

A second rubber sheet 14' is further wound around the first rubber sheet 12B'. The second rubber sheet 14' is obtained by rolling a rubber composition for forming the compression rubber portion 14 by calendering or the like, by which the short fiber 21C is oriented in the rolling direction. On the mandrel 30, the orientation direction of the short fiber 21C is the same as the axial direction of the mandrel 30.

Subsequently, the mandrel 30 is placed into a vulcanization chamber (unillustrated), and heating under pressure is carried out at a predetermined temperature and pressure. By this pressurized heating, the fabric 13, the rubber layer 12A', the cord 11, and the rubber sheets 12B', 14' are integrated by being vulcanized and molded in such a manner that the cord 11 is embedded between the integrated rubber layer 12A' and rubber sheet 12B'. Thus, a flat belt-shaped vulcanized sleeve can be obtained. The vulcanized sleeve is cut to have a predetermined width, and ground with an unillustrated grinding machine. Thus, the V-ribbed belt 10 (see FIG. 1) in which the ribs 15 are formed, is obtained.

Note that the rubber layer 12A' and the rubber sheets 12B', 14' form the upper layer 12A, the lower layer 12B, and the compression rubber portion 14 in the V-ribbed belt 10, respectively. In addition, the orientation directions of the fibers in the rubber layer 12A' and the rubber sheets 12B', 14' are the same as the axial direction or the circumferential direction of the mandrel 30. Hence, the orientation directions of the short fibers 21A to 21C in the resultant V-ribbed belt 10 are the same as the width direction or the longitudinal direction of the belt, as described above.

As described above, in this embodiment, the low-viscosity elastomer of lower in Mooney viscosity is incorporated into the rubber composition of the adhesion rubber portion in addition to the high-viscosity elastomer. Hence, even when the nylon fiber is incorporated in a large amount, the rubber composition of the adhesion rubber portion can be kneaded appropriately. Moreover, the incorporation of the high-viscosity elastomer in a larger amount in the adhesion rubber portion 12 (the upper layer 12A and the lower layer 12B), in combination with the inclusion of a large amount of the modified nylon microfiber, improves the modulus and the tear resistance performance of the adhesion rubber portion 12, so that the durability of the belt can be improved.

In addition, the use of the modified nylon microfiber as the short fibers in the adhesion rubber portion 12 having a predetermined constitution improves the adhesion of the rubber with the short fibers 21A, 21B and the adhesion between the cord 11 and the adhesion rubber portion 12. For this reason, cord separation, cracks starting from the short fiber, and the like are effectively prevented, so that the durability of the belt can be further improved.

Moreover, in general, especially when a V-ribbed belt is used under a high tension and a high load, the V-ribbed belt may be broken at an early stage by a large stress which acts on the compression rubber portion or the lower layer of the adhesion rubber portion along the longitudinal direction of the belt because of friction with pulleys. Meanwhile, the cord is shifted in position in the width direction and a pop-out movement in which the cord pops out of a side surface of the belt and results in cord separation, tends to occur in the adhesion rubber portion. In this embodiment, the short fiber 21B in the lower layer 12B oriented in the longitudinal direction of the belt resists the above-described stress acting along the longitudinal direction of the belt, thereby preventing breakage of the belt. In addition, the short fiber 21A in the upper layer 12A oriented in the width direction of the belt prevents the shift in position of the cord 11 in the width direction, thereby preventing the cord pop-out and cord separation. In sum, the V-ribbed belt 10 according to this embodiment has improved durability especially under high-tension and high-load environments, because the short fibers 21A, 21B are oriented in the predetermined directions.

Note that, in a case where the V-ribbed belt 10 is broken because of rib cracking or the like, the belt breakage can be found in advance by visual observation, because cracks or the like occur in the rib before the breakage. On the other hand, cord separation is difficult to find in advance by visual observation because the cord separation occurs inside the belt. Hence, cord separation tends to cause unpredictable transmission failure. Therefore, when belt breakage due to cord separation is prevented as in the case of this embodiment, the possibility of unpredictable transmission failure is reduced.

Note that the orientation directions of the short fibers 21A, 21B in the adhesion rubber portion 12 are not limited to the above-described directions. For example, the orientation direction of the short fiber 21B in the lower layer 12B may be made to extend along the width direction of the belt as in the case of the upper layer 12A. In this case, the first rubber sheet 12B' is wound around the mandrel 30 in such a manner that the orientation direction of the short fiber 21B is the same as the axial direction of the mandrel 30 in the above-described manufacturing method.

Moreover, the rubber composition of the adhesion rubber portion according to this embodiment may be used as an adhesion rubber of other frictional power transmission belts such as cogged V belts.

EXAMPLES

Hereinafter, examples are shown as specific examples of the present invention. However, the present invention is not limited to examples shown below.

Example 1

First, a pelletized fiber-loaded elastomer (nylon fiber content: 25% by weight) having the constitution shown in Table 1 was prepared, in which a nylon fiber was dispersed in a matrix composed of EPDM, a high-density polyethylene, and a small-particle-diameter spherical silica and the nylon fiber was bonded to the matrix.

TABLE 1

Constitution of Fiber-Loaded Elastomer

| | Parts by weight |
|---|---|
| EDPM | 100 |
| High-density polyethylene | 20 |
| Small-particle-diameter spherical silica | 20 |
| Nylon 6 fiber | 46.7 |

EPDM in Table 1 was Nordel 1P4640 (trade name, manufactured by The Dow Chemical Company) having a Mooney viscosity of 40, an ethylene content of 55%, and a diene content of 4.9% (kind of diene: ENB).

Next, the fiber-loaded elastomer, the high-viscosity elastomer (EPM), the low-viscosity elastomer (EPM), and the additives other than the peroxide vulcanization agent and the retarder shown in Table 2 were kneaded in a closed-type mixer under heating to around 160° C., and a uniform mixture thereof was obtained (the primary kneading). Subsequently, the kneaded mixture was transferred to an open roll, the peroxide vulcanization agent and the retarder were added thereto, and the mixture was kneaded at a temperature around 120° C. to obtain a uniform mixture. Thus, the rubber composition of the adhesion rubber portion was obtained. As can be understood from Tables 1 and 2, the high-viscosity elastomer:low-viscosity elastomer (weight ratio) was 60:40, and the nylon fiber was incorporated in an amount of 11.25 parts by weight relative to 100 parts by weight of the elastomers in the rubber composition of the adhesion rubber portion.

Subsequently, in accordance with the method of the embodiment, a V-ribbed belt was manufactured in which the upper layer and the lower layer of the adhesion rubber portion were formed from the rubber composition of the adhesion rubber portion. The V-ribbed belt was produced by carrying out vulcanization molding in a vulcanization chamber at 180° C. for 25 minutes under pressure. The manufactured V-ribbed belt was a 3PK belt with a length of 1040 mm and a width of 10.7 mm. In Example 1, the orientation directions of the fibers in the upper layer, the lower layer, and the compression rubber portion were set to be the same as the width direction of the belt, the longitudinal direction of the belt, and the width direction of the belt, respectively, as shown in FIG. 1. Note that a rubber composition used for forming the compression rubber portion was a rubber composition containing EPDM as the elastomer, and an aramid short fiber incorporated in an amount of 6 parts by weight relative to 100 parts by weight of the elastomer. Meanwhile, a woven fabric, which was plain-woven fabric of a nylon fiber and cotton, was used as the fabric, and an aramid cord was used as the cord.

TABLE 2

Constitutions of Rubber Compositions of Adhesion Rubber Portion

| | | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|
| Elastomers | High-viscosity elastomer (EPM) | 45.7 | 68.5 | 53.2 | 68.5 | 61.6 | 76.1 | — | 70 |
| | Low-viscosity elastomer (EPM) | 30.4 | — | 22.8 | — | 26.9 | — | — | 30 |
| | Low-viscosity elastomer (EOM) | — | 7.6 | — | 7.6 | — | — | — | — |
| | Silicone-modified EPDM | — | — | — | — | — | — | 100 | — |
| Fiber-loaded elastomer | | 45 | 45 | 45 | 45 | 22.5 | 45 | — | — |
| Additives | Large-particle-diameter silica | 60 | 67 | 60 | 67 | 60 | 60 | 40 | 60 |
| | Co-crosslinking agent | 2 | 2 | 2 | 2 | 2 | 2 | — | 2 |
| | Carbon black | 3 | 3 | 3 | 3 | 3 | 3 | 5 | 3 |
| | Vulcanization aid (ZnO) | 6 | 6 | 6 | 6 | 6 | 6 | — | 6 |
| | Vulcanization aid (zinc stearate) | 1.5 | 1.5 | 1.5 | 1.5 | 1.5 | 1.5 | — | 1.5 |
| | Metal cross-linking agent (zinc methacrylate) | 14 | 14 | 14 | 14 | 14 | 14 | 4.9 | 14 |
| | Antioxidant | 2 | 2 | 2 | 2 | 2 | 2 | 1 | 2 |
| | Peroxide vulcanization agent | 3.8 | 3.8 | 3.8 | 3.8 | 3.8 | 3.8 | 6 | 3.8 |
| | Retarder | 0.3 | 0.3 | 0.3 | 0.3 | 0.3 | 0.3 | 0.1 | 0.3 |
| Total | | 214 | 221 | 214 | 221 | 204 | 214 | 157 | 193 |

*1: Each numeric value in Table 2 indicates PHR (parts by weight of each material relative to 100 parts by weight of the elastomers). Meanwhile, "—" indicates that the material was not incorporated.
*2: The high-viscosity elastomer (EPM) was EPM with a Mooney viscosity of 63 and an ethylene content of 64% (trade name: Keltan 740, manufactured by DSM).
*3: The low-viscosity elastomer (EPM) was EPM with a Mooney viscosity of 2.5 (trade name: Keltan 1200A, manufactured by DSM).
*4: The low-viscosity elastomer (EOM) was an ethylene-1-octene copolymer with a melting point of 110° C. and a Mooney viscosity of 2 (trade name: Engage 8407P, manufactured by The Dow Chemical Company).
*5: The silicone-modified EPDM was SEP-1411U (trade name, manufactured by Shin-Etsu Chemical Co., Ltd.) with a Mooney viscosity of 28.8.

Example 2

Example 2 was carried out in the same manner as that in Example 1, except that the low-viscosity elastomer (EOM) was incorporated into the rubber composition of the adhesion rubber portion as a substitute for the low-viscosity elastomer (EPM), so that the weight ratio represented by the high-viscosity elastomer: low-viscosity elastomer was 90:10, and except for that one change the amounts of the various additives incorporated in Example 1 were adjusted as shown in Table 2.

Example 3

Example 3 was carried out in the same manner as that in Example 1, except that the amounts of the high-viscosity elastomer and the low-viscosity elastomer incorporated into the rubber composition of the adhesion rubber portion were changed, so that the weight ratio represented by the high-viscosity elastomer: low-viscosity elastomer was 70:30.

Example 4

Example 4 was carried out in the same manner as that in Example 2, except that the orientation direction of the short fiber (modified nylon microfiber) in the lower layer of the adhesion rubber portion was changed to the width direction of the belt.

Example 5

Example 5 was carried out in the same manner as that in Example 1, except that the amounts of the fiber-loaded elastomer, the high-viscosity elastomer, and the low-viscosity elastomer incorporated into the rubber composition of the adhesion rubber portion were changed, so that the weight ratio represented by the high-viscosity elastomer: low-viscosity elastomer was 70:30, and the nylon fiber was incorporated in an amount of 5.6 parts by weight relative to 100 parts by weight of the elastomers.

Comparative Example 1

Comparative Example 1 was carried out in the same manner as that in Example 1, except that no low-viscosity elastomer was incorporated, so that the weight ratio represented by the high-viscosity elastomer: the low-viscosity elastomer was 100:0 in the rubber composition of the adhesion rubber portion. In this comparative example, the incorporated materials were not successfully kneaded in the secondary kneading where the kneading temperature was low, and a rubber composition of the adhesion rubber portion was not successfully obtained. For this reason, a V-ribbed belt was not successfully manufactured by using the rubber composition of the adhesion rubber portion having the constitution shown in Table 2 in this comparative example.

Comparative Example 2

Comparative Example 2 was carried out in the same manner as that in Example 1, except that the constitution of the rubber composition of the adhesion rubber portion was changed as shown in Table 2, where the silicone-modified EPDM was used as the elastomer material of the adhesion rubber portion, and no modified nylon microfiber was incorporated.

Comparative Example 3

Comparative Example 3 was carried out in the same manner as that in Example 1, except that no fiber-loaded elastomer was incorporated into the rubber composition of the adhesion rubber portion, and the incorporated amounts of the high-viscosity elastomer and the low-viscosity elastomer were changed, so that no modified nylon microfiber was included in the adhesion rubber portion, and the weight ratio represented by the high-viscosity elastomer: low-viscosity elastomer was 70:30.

A vulcanized rubber sample of the rubber composition of the adhesion rubber portion of each of the Examples and Comparative Examples was prepared and evaluated for various physical properties, and a drive test was carried out by using the belt of each of the Examples and Comparative Examples, as shown below. Note, however, that since the rubber composition of the adhesion rubber portion of Example 4 was the same as that of Example 2, the evaluation for physical properties of Example 4 was omitted. In addition, since no rubber composition of an adhesion rubber portion was successfully obtained in Comparative Example 1 as described above, the evaluation for physical properties and the drive test were not carried out on Comparative Example 1.

[Tensile Test]
In accordance with JIS K6251, a vulcanized rubber sample with the dumbbell shape No. 5 was pulled, and stresses (M10 to M200) were determined at elongations of 10% to 200%. Each rubber sample of Examples 1 to 3 and 5 where the short fiber was included was subjected to this test both in the case (grain) where the orientation direction of the short fiber was the same as the pulling direction, and in the case (cross-grain) where the orientation direction of the short fiber was made perpendicular to the pulling direction. In addition, the test was carried out under both a normal temperature environment (23° C.) and a high-temperature environment (120° C.). Table 3 shows the measurement results.

[Tear Test]
The tear strength of a vulcanized rubber sample, which was prepared as "the unnicked angle-type test piece," was determined in accordance with JIS K6252. Note that, for each of Examples 1 to 3, and 5, the tear strength was determined both in the case where the short fiber was oriented in the grain direction and in the case where the short fiber was oriented in the cross-grain direction under a normal temperature environment (23° C.) and a high-temperature environment (120° C.), in this tear test as in the case of the tensile test.

Figure 3:
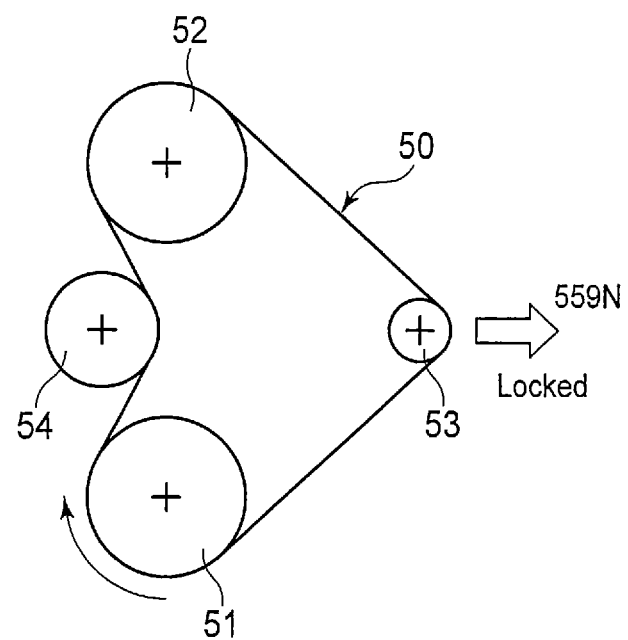
FIG. 3 shows a layout in a drive test.

[Drive Test]
As shown in FIG. 3, the belt 50 of each of the Examples and Comparative Examples was wound around a driving pulley 51 having a pulley diameter of 120 mm, a driven pulley 52 having a pulley diameter of 120 mm, and a tensioner pulley 53 having a pulley diameter of 45 mm and being arranged on the tight side of the belt. The belt 50 was subjected to reverse bending on the slack side with an idler pulley 54 having a pulley diameter of 85 mm. Then, in a state where the belt 50 was stretched by the tensioner pulley 53 with a force of 559 N while a load of 8.8 kW was applied to the driven pulley 52, the belt 50 was driven by rotating the driving pulley 51 at 4900 rpm with the maximum tension of 350 N/rib. In this test, under 100° C. ambient temperature conditions, the breakage time at which the belt 50 was broken to the extent that the belt 50 could no longer be driven was regarded as the belt lifetime. Meanwhile, the time at which an initial breakage was observed in the belt 50 was also determined, and that time was regarded as the initial fracture time. Note that, for each of the Examples and Comparative Examples, an observation was made for the fracture mode in which the belt 50 reached the end of the belt lifetime and for the fracture mode in which the initial breakage occurred.

[De Mattia Test]
Example 1 and Comparative Example 2 were evaluated for durability based on flex crack growth by carrying out the De Mattia test in accordance with JIS K6260 by use of a vulcanized rubber sample obtained from the rubber composition of the adhesion rubber portion. In the evaluation of the durability based on flex crack growth, each sample, which had a nick formed at the center thereof and was then subjected to 25000 bending cycles under an environment of 120° C. at a bending angle of 180°, was evaluated based on the following criteria. In addition, Example 1 was evaluated in terms of durability based on developing flex cracks by subjecting each sample, which had no nick formed therein, to one million bending cycles under a temperature environment of 130° C. at a bending angle of 180°. Note that, as for Example 1, both a sample (grain) in which the fiber was oriented in the longitudinal direction of the sample and a sample (cross-grain) in which the fiber was oriented in the width direction were evaluated.

<Durability Based on Flex Crack Growth>

E: The nick was not widened at all or only barely widened, indicating that the durability based on flex crack growth was excellent.

G: The nick was widened, but not to an end portion, indicating that the durability based on flex crack growth was good.

I: The nick was widened to both ends, and the test was discontinued, indicating that the durability based on flex crack growth was insufficient. Note that the number of times at which the test was halted is shown in parentheses.

<Durability Based on Developing Flex Cracks>

E: None or almost no cracks occurred, indicating that the durability based on developing flex cracks was excellent.

I: A large crack occurred, indicating that the durability based on developing flex cracks was insufficient.

On the other hand, in each of Comparative Examples 2 and 3 where no short fiber was incorporated into the adhesion rubber portion, the tensile strength and the tear strength were poor, and the durability of the belt was also poor. Moreover, since cord separation occurred in Comparative Examples 2 and 3, it is conceivable that unpredictable transmission failure tends to occur in Comparative Examples 2 and 3. Furthermore, in Example 5 where the short fiber was incorporated, but the incorporated amount thereof was less than 10 parts by weight, the tensile strength and the tear strength were relatively good, but the drive lifetime was at the same level as that of Comparative Example 3 where no short fiber was incorporated, and also cord separation did occur in Example 5. From these results, although the reason has not been clarified, it can be understood that, when a large amount of a nylon fiber is not incorporated into the adhesion rubber, the physical properties

TABLE 3

| | | | Example 1 | | Example 2 | | Example 3 | | Example 4 | Example 5 | | Comp. Ex. 2 | Comp. Ex. 3 |
|---|---|---|---|---|---|---|---|---|---|---|---|---|---|
| | | | Grain | Cross-grain | Grain | Cross-grain | Grain | Cross-grain | | Grain | Cross-grain | No short fiber | No short fiber |
| Tensile test (normal temp.) | M10 (MPa) | 10% | 4.12 | 2.87 | 5.50 | 2.75 | 4.30 | 2.94 | — | 2.61 | 2.08 | 1.35 | 1.63 |
| | M20 (MPa) | 20% | 5.14 | 3.35 | 7.07 | 3.45 | 5.32 | 3.57 | — | 3.15 | 2.60 | 1.91 | 1.99 |
| | M50 (MPa) | 50% | 7.74 | 4.07 | 10.86 | 4.31 | 7.95 | 4.65 | — | 4.25 | 3.25 | 3.11 | 2.48 |
| | M100 (MPa) | 100% | 11.14 | 5.30 | 14.26 | 6.05 | 10.97 | 6.62 | — | 6.15 | 4.35 | 6.40 | 3.31 |
| | M200 (MPa) | 200% | 14.73 | 8.89 | 17.49 | 10.39 | 14.53 | 10.77 | — | 10.26 | 7.80 | 14.78 | 5.99 |
| Tensile test (120° C.) | M10 (MPa) | 10% | 1.73 | 1.34 | 2.19 | 1.40 | 1.74 | 1.42 | — | 1.38 | 1.28 | 1.12 | 1.23 |
| | M20 (MPa) | 20% | 2.45 | 1.66 | 3.37 | 1.83 | 2.37 | 1.90 | — | 1.83 | 1.68 | 1.72 | 1.59 |
| | M50 (MPa) | 50% | 4.12 | 2.19 | 5.98 | 2.51 | 3.90 | 2.71 | — | 2.63 | 2.27 | 2.98 | 2.14 |
| | M100 (MPa) | 100% | 6.28 | 2.76 | 8.57 | 3.42 | 5.94 | 3.75 | — | 3.76 | 3.01 | 5.45 | 2.86 |
| | M200 (MPa) | 200% | 8.35 | 4.12 | 10.34 | 5.55 | 8.23 | 5.89 | — | 5.85 | 4.77 | — | 4.59 |
| Tear strength-normal temp. (N/mm) | | | 71.35 | 74.29 | 67.51 | 77.01 | 71.95 | 82.23 | — | 69.28 | 74.00 | 58.57 | 65.02 |
| Tear strength-120° C. (N/mm) | | | 39.78 | 38.40 | 32.71 | 35.12 | 35.88 | 38.33 | — | 38.20 | 38.25 | 27.20 | 38.33 |
| De Mattia test | Durability based on flex crack growth | | E | G | — | — | — | — | — | — | — | I (13000) | — |
| | Durability based on flex cracking development | | E | E | — | — | — | — | — | — | — | — | — |
| Drive Test | Belt lifetime (hours) | | 751.6 | | 661.9 | | 465.3 | | 450.2 | 364 | | 281.5 | 367.2 |
| | Initial fracture time (hours) | | 532.6 | | 646.4 | | 338 | | 450.2 | 338.1 | | 148.1 | 286.7 |
| | Initial fracture mode | | Rib bottom crack | | Rib bottom crack | | Many small rib cracks, and rib bottom crack | | The same as final fracture mode | Middle and small rib cracks, rib bottom crack, and cord separation | | Cord separation | Cord separation |
| | Final fracture mode (at end of belt lifetime) | | Cut at rib crack position | | Separation between adhesion layer and compression rubber portion | | Occurrence of large rib crack, many middle and small rib cracks | | Cut at joint of fabric | Rib chipping Rib crack | | Belt cut | Cut at cord separation portion |

Note
that "—" in the table indicates that the item was not determined.

As is apparent from the results shown in Table 3, as for each of Examples 1 to 4 of the present invention, the tensile strength and the tear strength in the grain direction were good, and the drive lifetime of the belt was also good. In addition, it can be understood that the possibility of unpredictable transmission failure is reduced because no cord separation occurred. Moreover, the time from the initial fracture to the final fracture was extended in each of Examples 1 and 3 where the high-viscosity and low-viscosity elastomers were both EPM, the orientation direction of the short fiber in the lower layer was the same as the longitudinal direction of the belt, and the orientation direction of the short fiber in the upper layer was the same as the width direction of the belt. Hence, it can be understood that transmission failure can be found rather easily in each of Examples 1 and 3.

are improved to some degree, but the belt lifetime cannot be significantly extended in the present invention.

The invention claimed is:

1. A frictional power transmission belt, which is formed from rubber and includes an embedded cord that extends in the longitudinal direction of the belt, wherein at least a part of the rubber surrounding the cord is obtained by vulcanizing a rubber composition that includes a high-viscosity elastomer and a low-viscosity elastomer, and contains a modified nylon microfiber, and the high-viscosity elastomer is at least one elastomer selected from the group consisting of ethylene-propylene copolymers and ethylene-propylene-diene terpolymers, and the low-viscosity elastomer is lower in Mooney viscosity at 125° C. than the high-viscosity elastomer.

2. The frictional power transmission belt according to claim 1, wherein the Mooney viscosity at 125° C. of the low-viscosity elastomer is less than or equal to 10.

3. The frictional power transmission belt according to claim 1, wherein the Mooney viscosity at 125° C. of the high-viscosity elastomer is greater than or equal to 50.

4. The frictional power transmission belt according to claim 1, wherein in at least a part of the rubber, the nylon fiber quantity of the modified nylon microfiber is not less than 10 parts by weight relative to 100 parts by weight of the elastomers.

5. The frictional power transmission belt according to claim 1, wherein the weight ratio of the high-viscosity elastomer to the low-viscosity elastomer is 95:5 to 50:50.

6. The frictional power transmission belt according to claim 1, wherein the low-viscosity elastomer is at least one elastomer selected from the group consisting of ethylene-propylene copolymers and ethylene-propylene-diene terpolymers.

7. The frictional power transmission belt according to claim 6, wherein the weight ratio of the high-viscosity elastomer to the low-viscosity elastomer is 70:30 to 50:50.

8. The frictional power transmission belt according to claim 1, wherein
the frictional power transmission belt comprises an adhesion rubber portion which contains the modified nylon microfiber and is formed by vulcanizing the rubber composition, and
the cord is embedded in the adhesion rubber portion.

9. The frictional power transmission belt according to claim 8, wherein the frictional power transmission belt further comprises a compression rubber portion provided below the adhesion rubber portion.

10. The frictional power transmission belt according to claim 9, wherein the compression rubber portion includes a short fiber oriented in the width direction of the belt.

11. The frictional power transmission belt according to claim 9, wherein
the adhesion rubber portion is composed of an upper layer constituting the upper side and a lower layer constituting the lower side, which are located across the cord,
each of the upper layer and lower layer contains the modified nylon microfiber and is formed by vulcanizing the rubber composition, and
the modified nylon microfiber contained in the upper layer is oriented in the width direction of the belt, while the modified nylon microfiber contained in the lower layer is oriented in the longitudinal direction of the belt.

12. The frictional power transmission belt according to claim 1, wherein the modified nylon microfiber is obtained by bonding nylon fiber to a matrix composed of polyolefin, an elastomer and spherical silica with average particle diameter of 1 μm or less and moisture content of 1000 ppm or less.

13. A method of manufacturing a frictional power transmission belt which is formed from rubber and includes an embedded cord that extends in the longitudinal direction of the belt, the method comprising:
a first step of obtaining a rubber composition by kneading a modified nylon microfiber, a high-viscosity elastomer and a low-viscosity elastomer; and
a second step of molding the rubber composition as a rubber adhered to the cord by arranging the rubber composition around the cord followed by vulcanizing, wherein
the high-viscosity elastomer is at least one elastomer selected from the group consisting of ethylene-propylene copolymers and ethylene-propylene-diene terpolymers, and the low-viscosity elastomer is lower in Mooney viscosity at 125° C. than the high-viscosity elastomer.

14. An adhesion rubber provided to surround a cord that is a tension member of a belt, wherein
at least a part of the adhesion rubber is obtained by vulcanizing a rubber composition that includes a high-viscosity elastomer and a low-viscosity elastomer, and contains a modified nylon microfiber, and
the high-viscosity elastomer is at least one elastomer selected from the group consisting of ethylene-propylene copolymers and ethylene-propylene-diene terpolymers, and the low-viscosity elastomer is lower in Mooney viscosity at 125° C. than the high-viscosity elastomer.

15. A rubber composition, comprising a modified nylon microfiber, a high-viscosity elastomer and a low-viscosity elastomer, wherein
the high-viscosity elastomer is at least one elastomer selected from the group consisting of ethylene-propylene copolymers and ethylene-propylene-diene terpolymers, and the low-viscosity elastomer is lower in Mooney viscosity at 125° C. than the high-viscosity elastomer.

* * * * *